US011481794B2

(12) United States Patent
Beaty et al.

(10) Patent No.: US 11,481,794 B2
(45) Date of Patent: Oct. 25, 2022

(54) COMMUNICATIONS PLATFORM FOR LINKING RULES WITH INDEPENDENTLY DEFINED REWARDS

(71) Applicant: RedCritter Corp., Flower Mound, TX (US)

(72) Inventors: Robert M. Beaty, Flower Mound, TX (US); Dan D. Hoffman, Flower Mound, TX (US); James L. Rockett, Jr., Carrollton, TX (US); Randy M. Whelan, Coppell, TX (US); David R. Jenness, Flower Mound, TX (US); Erika D. Lambert, Flower Mound, TX (US)

(73) Assignee: RedCritter Corp., Flower Mound, TX (US)

( * ) Notice: Subject to any disclaimer, the term of this patent is extended or adjusted under 35 U.S.C. 154(b) by 113 days.

(21) Appl. No.: 17/028,750

(22) Filed: Sep. 22, 2020

(65) Prior Publication Data
US 2022/0092623 A1   Mar. 24, 2022

(51) Int. Cl.
*G06Q 30/02*     (2012.01)
*G06Q 50/00*     (2012.01)
(Continued)

(52) U.S. Cl.
CPC ......... *G06Q 30/0208* (2013.01); *G06F 9/547* (2013.01); *G06F 16/285* (2019.01);
(Continued)

(58) Field of Classification Search
CPC .. G06Q 30/0208; G06Q 50/01; G06Q 50/205; G06F 16/285; G06F 9/547; G09B 19/00
See application file for complete search history.

(56) References Cited

U.S. PATENT DOCUMENTS 9,996,848 B2 *   6/2018   Login ................. G06Q 30/0226
10,255,242 B2 *  4/2019   Rockett .................... G06F 16/26
(Continued)

OTHER PUBLICATIONS

Grier, 2005_.*
(Continued)

*Primary Examiner* — Michael I Ezewoko
(74) *Attorney, Agent, or Firm* — Kirton McConkie; Brian Tucker

(57) ABSTRACT

As part of implementing a recognition and reward system, a communications platform can employ a unique set of data structures, APIs and a rules engine that abstract the definition of rewards from the definition of rules for determining when the rewards should be made available. Accordingly, boosters may interface directly with the communications platform to offer rewards to participants but need not be aware of or involved in the process of defining the rules that will be used to distribute the rewards. Likewise, administrators may interface directly with the communications platform to define rules for making rewards available without needing to be aware of the rewards themselves. In this way, a communications platform can integrate boosters and their rewards into a recognition and rewards system without requiring tight coupling between the rules for determining when rewards should be made available and the rewards themselves.

18 Claims, 14 Drawing Sheets

(51) Int. Cl.
*G06Q 50/20* (2012.01)
*G06F 16/28* (2019.01)
*G09B 19/00* (2006.01)
*G06F 9/54* (2006.01)

(52) U.S. Cl.
CPC .......... *G06Q 50/01* (2013.01); *G06Q 50/205* (2013.01); *G09B 19/00* (2013.01)

(56) References Cited

U.S. PATENT DOCUMENTS

| | | | |
|---|---|---|---|
| 10,412,468 B1* | 9/2019 | Beaty | H04N 21/47217 |
| 2015/0142689 A1* | 5/2015 | Squires | G06Q 50/01 |
| | | | 702/158 |
| 2017/0076623 A1* | 3/2017 | Grimes | G09B 7/08 |
| 2018/0211274 A1* | 7/2018 | Gore | G06Q 30/0239 |
| 2018/0285910 A1* | 10/2018 | De Kleijn | G06Q 20/3255 |

OTHER PUBLICATIONS

Edelman, 2008.*
Wirth, 1976.*
Dam, 2013.*
Goffman, 1974.*
Kuhn, 1962.*
Hayles, 2005_.*
Lakoff, 1980.*
Mindell, 2015_.*
Treffert, 2010.*
APIs, Sep. 2020.*
Evans, Invisible Engines, 2006.*

* cited by examiner

Admin Rules Data Structure 300a

Rule1 = {
  Subdomain = SchoolID1;
  LevelRequirementList = {LR1, LR2, LR3, LR4};
  ActivityCategoryList = {AC1, AC2, AC3, AC4, ...};
  ActivityRuleList = {AR1, AR2, AR3, AR4, AR5, ...}
}
...

Level Requirement Data Structures 301

LR1 = {PointsRequired = 100, Level = Bronze}
LR2 = {PointsRequired = 200, Level = Silver}
LR3 = {PointsRequired = 300, Level = Gold}
LR4 = {PointsRequired = 500, Level = Diamond}
...

Activity Category Data Structures 302

AC1 = {
  CategoryName = Category1,
  MaxPoints = 50,
  Multiplier = 1
},
AC2 = {
  CategoryName = Category2,
  MaxPoints = 100,
  Multiplier = 2
},
...

Activity Rule Data Structures 303

AR1 = {
  TriggeringActivity = Activity1,
  Points = 1,
  CategoryName = Category1,
},
AR2 = {
  TriggeringActivity = Activity2,
  Points = 5,
  CategoryName = Category1,
},
AR3 = {
  TriggeringActivity = Activity3,
  Points = 1,
  CategoryName = Category2,
},
...

*FIG. 4*

```
Booster Reward Data Structures 311

Reward1 = {
    RewardID = RID1;
    BoosterID = BID1;
    Name = ...;
    Description = ...;
    RequiredLevel = 1;
    StartWeek = ...;
    EndWeek = ...;
    MaxQtyPerWeek = ...;
    RemainingQty = ...;
    RedeemType = ...;
    ...
};
Reward2 = {
    RewardID = RID2;
    BoosterID = BID1;
    Name = ...;
    Description = ...;
    RequiredLevel = 2;
    StartWeek = ...;
    EndWeek = ...;
    MaxQtyPerWeek = ...;
    RemainingQty = ...;
    RedeemType = ...;
    ...
};
```

```
Booster Data Structures 310

Booster1 = {
    BoosterID = BID1;
    BoosterType = non-profit;
    BoosterName = Local Store;
    Approved = True;
    ...
};
Booster2 = ...
...
```

*FIG. 5*

User Participation Data Structures 321

```
ParticipationBlob1 = {
    UserID = User1;
    WeekID = 1;
    TotalPoints = ...;
    Level = ...;
    CategoryPoints = ...;
    ...
}

ParticipationBlob2 = {
    UserID = User1;
    WeekID = 2;
    TotalPoints = ...;
    Level = ...;
    CategoryPoints = ...;
    ...
}

ParticipationBlob3 = {
    UserID = User2;
    WeekID = 1;
    TotalPoints = ...;
    Level = ...;
    CategoryPoints = ...;
    ...
}
```

User Data Structures 320

```
User1 = {
    UserID = User1;
    First Name = ...;
    Last Name = ...;
    ...
}

User2 = ...
...
```

*FIG. 6*

Booster Reward Data Structures 311

Reward1 = {
  RewardID = RID1;
  BoosterID = BID1;
  Name = ...;
  Description = ...;
  RequiredLevel = 1;
  StartWeek = 1;
  EndWeek = 2;
  MaxQtyPerWeek = ...;
  RemainingQty = ...;
  RedeemType = ...;
  ...
};

Reward2 = {
  RewardID = RID2;
  BoosterID = BID1;
  Name = ...;
  Description = ...;
  RequiredLevel = 2;
  StartWeek = 1;
  EndWeek = 5;
  MaxQtyPerWeek = ...;
  RemainingQty = ...;
  RedeemType = ...;
  ...
};

(3) API server 220 accesses user participation data structures 321 and booster reward data structures 311 to identify which rewards should be made available to the student API Server(s) 220

User Participation Data Structures 321

ParticipationBlob1 = {
  UserID = User1;
  WeekID = 1;
  TotalPoints = ...;
  Level = 4;
  CategoryPoints = ...;
  ...
};

ParticipationBlob2 = {
  UserID = User1;
  WeekID = 2;
  TotalPoints = ...;
  Level = 1;
  CategoryPoints = ...;
  ...
};

*FIG. 10B*

COMMUNICATIONS PLATFORM FOR LINKING RULES WITH INDEPENDENTLY DEFINED REWARDS

CROSS-REFERENCE TO RELATED APPLICATIONS

Embodiments of the present invention may be implemented within the communications platform described in U.S. Pat. No. 10,255,242 and other similar communications platforms that may be utilized to implement a recognition and reward system.

BACKGROUND

One problem faced by many educators, employers, managers, etc. is developing systems for challenging their students, employees, associates, etc. to improve their skills and abilities. It is known that recognition and reward systems provide a good incentive for such individuals to strive to improve themselves within their respective environments. However, the implementation of such systems can be difficult, time consuming, and not easily scaled. For example, in a school environment, the success of a recognition and reward system is dependent on parental involvement, but it is difficult to establish and maintain the necessary communications to involve the parents. Similar problems exist in the workplace where it is important that an employee's immediate supervisor be involved in managing the employee's involvement in the recognition and reward system.

Various recognition and reward systems exist in the prior art. However, many of these systems are limited to a particular environment or are dependent on specialized and complex end-user computing configurations. Such systems are therefore limited in their scalability and are oftentimes difficult to use. For these reasons, the users, including teachers and students or managers and employees alike, are less inclined to participate in a recognition and reward program. In short, for a reward and recognition system to be successful, it must provide a simple and streamlined experience to all end-users.

The success of a recognition and reward system is related to the incentive it can provide to the end users. For example, a student may not be motivated to participate in the recognition and reward system if the rewards are not of interest to the student. Yet, many organizations, and particularly schools, are limited in the rewards they can provide, whether or not the rewards are provided manually or via participation in a recognition and reward system. It is therefore customary for organizations such as schools to solicit rewards from boosters.

Some recognition and rewards systems provide a way to integrate rewards that a booster may offer. However, such integration may largely be manual. For example, a booster may inform a school administrator that it will reward a student with a free item if the student performs some action within the recognition and rewards system. The burdens created by such manual integration may outweigh the benefit of any incentive the free item may provide. In contrast, some recognition and reward systems directly integrate a booster's rewards into the system. Yet, this may also burden the school administrators and IT professionals with the task of defining how the rewards should be integrated, distributed and redeemed.

Accordingly, although existing recognition and rewards systems may provide a way to integrate boosters and their rewards, there is a technical problem of configuring a communications platform to enable such integration. There is also a technical problem of enabling such integration without requiring tight coupling between the rules for determining when rewards should be issued and the rewards themselves. Due to these challenges, many organizations forego the use of computer-based recognition and reward systems and rely on traditional and manual approaches for distributing a booster's rewards.

BRIEF SUMMARY

The present invention extends to the underlying design and configuration of a communications platform that enables it to link rules with independently defined rewards. The communications platform can be configured to implement a recognition and reward system. As part of implementing the recognition and reward system, the communications platform can employ a unique set of data structures, application programming interfaces and a rules engine that abstract the definition of rewards from the definition of rules for determining when the rewards should be made available. Accordingly, boosters may interface directly with the communications platform to offer rewards to participants but need not be aware of or involved in the process of defining the rules that will be used to distribute the rewards. Likewise, administrators may interface directly with the communications platform to define rules for making rewards available without needing to be aware of the rewards themselves. In this way, the present invention provides a technical solution of configuring a communications platform to enable integration of boosters and their rewards into a recognition and rewards system without requiring tight coupling between the rules for determining when rewards should be made available and the rewards themselves.

In some embodiments, the present invention may be implemented as a communications platform for integrating rewards into a recognition and rewards system without requiring the rewards to be tightly coupled to rules that define when the rewards are available. The communications platform may include an API server that receives API requests from a plurality of client devices. The API requests may include a first set of API requests for creating rules defining when rewards are to be made available to users and a second set of API requests for creating the rewards. The communications platform may also include a storage system that stores admin rules data structures that define the rules. Each admin rules data structure may define a plurality of levels. The storage system may also store booster reward data structures. Each booster reward data structure may define a reward and a level. The plurality of levels defined in each admin rules data structure may be set by an admin via the first set of API requests and the level defined in each booster reward data structure may be independently set by a booster via the second set of API requests. The communications platform may also include a rules engine that evaluates users' activities against the rules to thereby calculate a level for each user. The API server may employ the level calculated from the rules for each user and the level defined in each booster reward data structure to determine which rewards to present to each user.

In some embodiments, the present invention may be implemented as a method, performed in a communications platform, for integrating rewards into a recognition and rewards system without requiring the rewards to be tightly coupled to rules that define when the rewards are available. An API server can receive a first API request from and admin's client device where the first API request requests the creation of a first rule for defining when rewards are to be made available to users of the recognition and rewards system. The first API request may include a plurality of levels. An admin rules data structure for the first rule can be created in a storage system. The admin rules data structure can define the plurality of levels. The API server can receive a second API request from a booster's client device where the second API request requests the creation of a first reward that the booster desires to be made available to the users of the recognition and rewards system. The second API request can associate a level with the first reward. A booster reward data structure that defines the first reward and the level can be created in the storage system. A rules engine can evaluate a user's activities against the first rule to thereby calculate a level for the user. The level calculated for the user by evaluating the user's activities against the first rule can be compared to the level defined in the booster reward data structure. In conjunction with determining that the level calculated for the user by evaluating the user's activities against the first rule meets the level defined in the booster reward data structure, the first reward can be presented to the user.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 4 provides an example of various data structures that may be employed to independently define admin rules that are used to determine when rewards are to be made available within a recognition and rewards system that the communications platform implements;

FIG. 5 provides an example of various data structures that may be employed to independently define rewards that a booster has made available for distribution within the recognition and rewards system that the communications platform implements;

FIG. 6 provides an example of various data structures that may be employed to link the rules to the independently defined rewards;

FIGS. 10A-10C represent how the communication platform can identify rewards that are available to a user based on applying rules to the user's activities without requiring the rules to be coupled to the rewards.

DETAILED DESCRIPTION

Figure 1:
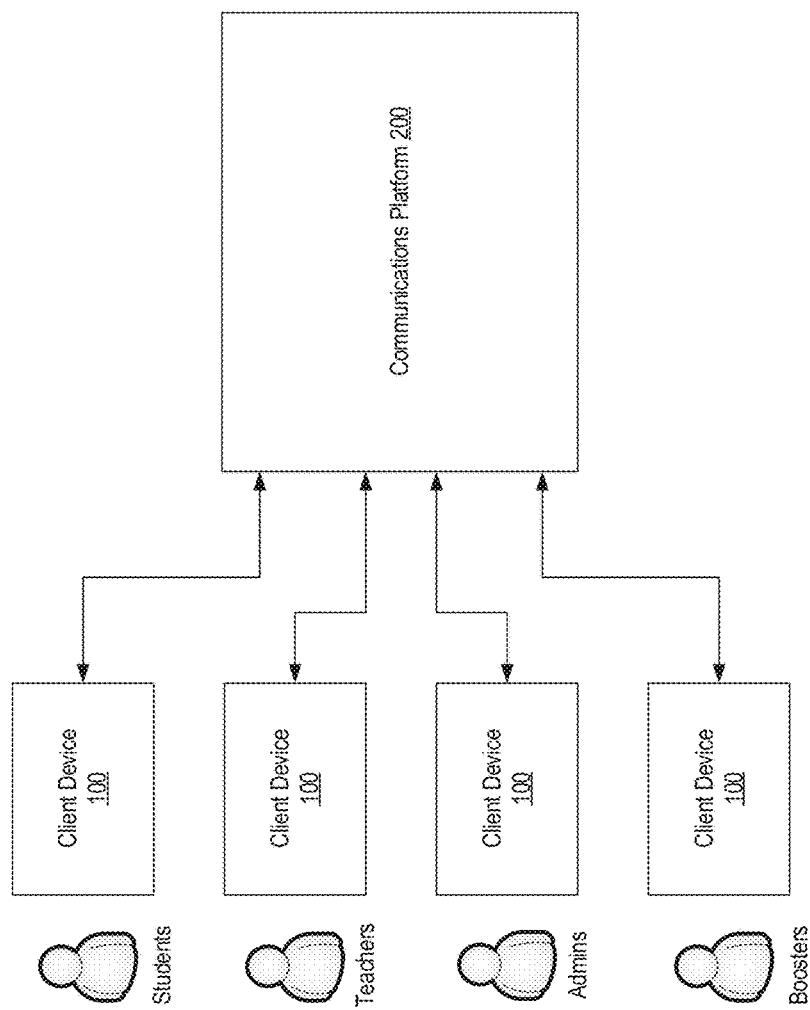
FIG. 1 illustrates and example computing environment in which embodiments of the present invention may be implemented.

FIG. 1 illustrates an example computing environment in which embodiments of the present invention may be implemented. As shown, the computing environment may include a communications platform 200 and a number of client devices 100. Communications platform 200 may be configured to implement a recognition and rewards system such as is described in U.S. Pat. No. 10,255,242 as one example only. Client devices 100 can represent any computing device that a user employs to access communications platform 200. In the specification, communications platform 200 will be described as providing a recognition and rewards system in a school environment. Accordingly, FIG. 1 shows students, teachers, admins and boosters employing client devices 100 to access communications platform 200. It should be understood, however, that embodiments of the present invention may be implemented as part of providing a recognition and reward system in any other environment such as a workplace environment.

Figure 2:
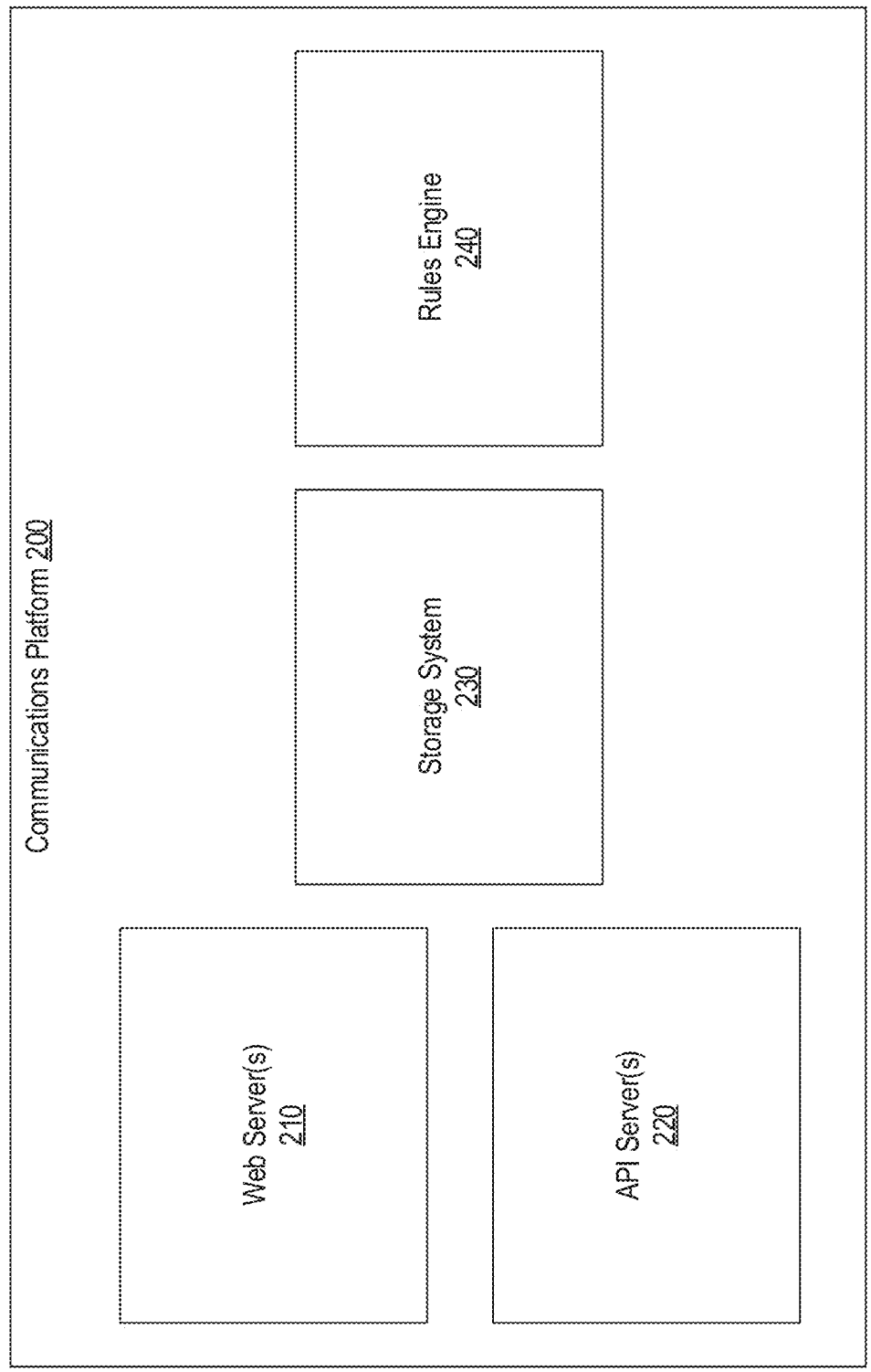
FIG. 2 illustrates an example of various components of a communications platform that may be configured in accordance with embodiments of the present invention.

FIG. 2 provides an example of various components that communications platform 200 may include in some embodiments of the present invention. These components include one or more web servers 210 (or simply web server 210), one or more API servers 220 (or simply API server 220), a storage system 230 and a rules engine 240. Web server 210 can be configured to provide web content to client devices 100 by which the various users may access functionality of communications platform 200. For example, web server 210 can provide various websites, web applications or other browser-based content that can be displayed on client devices 100. However, web server 210 could be replaced with or work in conjunction with client-side applications (e.g., a mobile or desktop app).

API server 220 can provide a number of APIs by which client devices 100 can interface with communications platform 200. For example, API server 220 can provide an API by which an admin can define rules for determining when rewards should be made available in a recognition and rewards system that communications platform 200 implements. API server 200 can also provide an API by which a booster can independently define rewards that can be distributed in the recognition and rewards system.

Storage system 230 can be employed to maintain a set of data structures that are uniquely configured and leveraged to enable rules to be linked with independently defined rewards. In some embodiments, API server 220 can be configured to interface with storage system 230 to create and update such data structures. Rules engine 240 can be configured to evaluate the data structures maintained in storage system 230 and update them as appropriate. Of primary relevance to this description, rules engine 240 can apply admin-defined rules to a particular student's activities to calculate points for the student. The application of such rules, including the calculation of a student's points, can be performed independently of any reward that a booster may have defined within communications platform 200. API server 220 can be configured to evaluate the student's points—i.e., the results of applying the independently defined rules—to rewards that any booster may have defined to thereby identify which rewards should be made available to the student.

Figure 3:
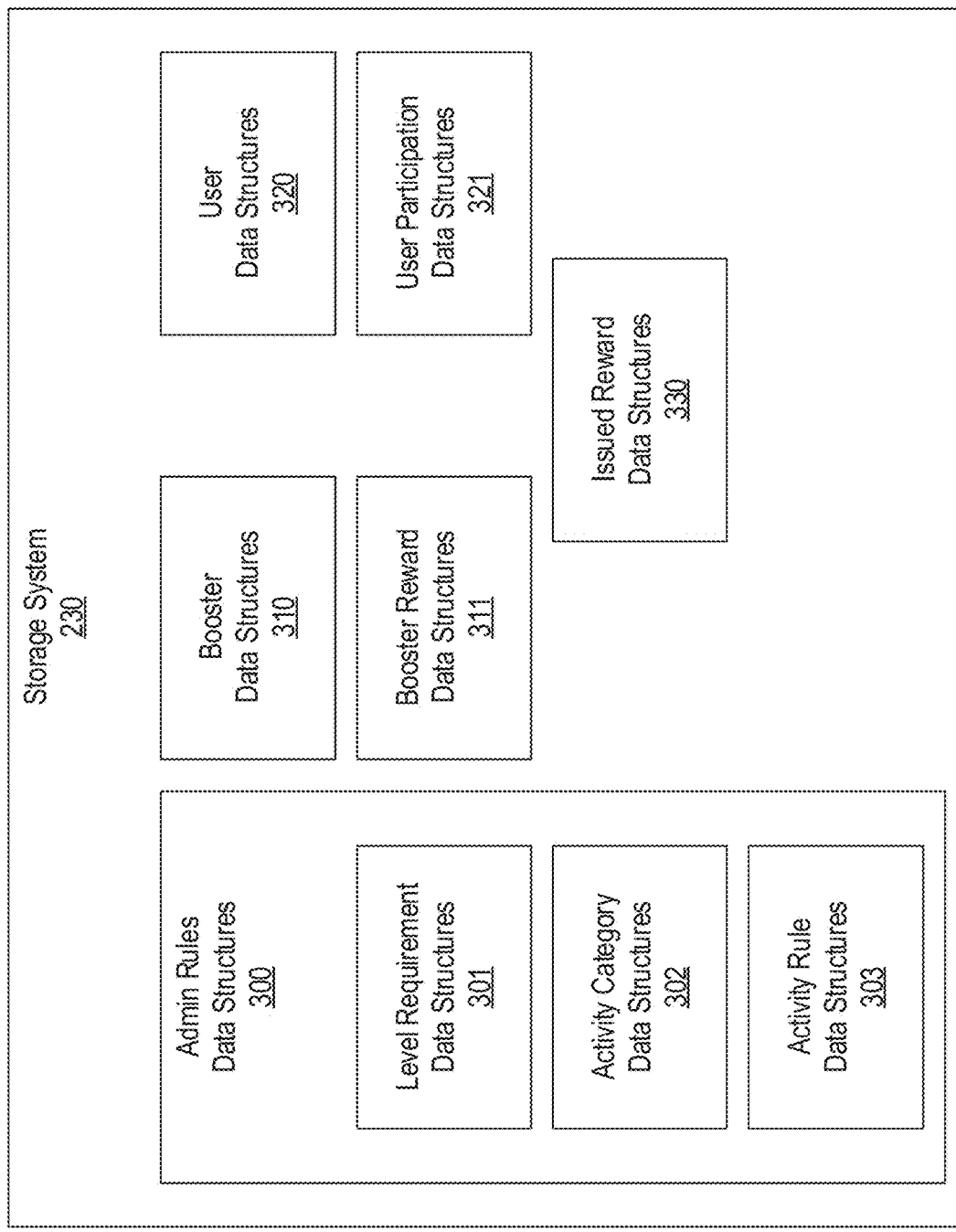
FIG. 3 provides an example of various data structures that may be maintained in a storage system of the communications platform in accordance with embodiments of the present invention.

FIG. 3 provides an example of a set of data structures that storage system 230 may maintain in some embodiments of the present invention. As shown, storage system 230 may maintain a number of admin rules data structures 300 which may include level requirement data structures 301, activity category data structures 302 and activity rule data structures 303. An admin at a school (or other organization) can define one or more rules that apply to the school. Admin rules data structures 300a can represent how communications platform 200 defines/stores such rules. Notably and as described in detail below, these data structures can be employed to define rules within communications platform 200 independently of any rewards.

Storage system 230 may also maintain booster data structures 310 and booster reward data structures 311. A booster can define one or more rewards that it would like to make available to students at a particular school or schools. Booster reward data structures 311 can represent how communications platform 200 defines/stores such rewards. Again, booster reward data structures 311 can be defined independently of any rules that may be applicable to the school.

Storage system 230 may also maintain user data structures 320 and user participation data structures 321 that can be employed to define a user (e.g., student) and his or her participation within a recognition and rewards system that communications platform 200 implements. Storage system 230 may further define issued reward data structures 330 that can be employed to define which rewards have been issued to each user.

FIG. 4 provides a generalized example of how an admin rules data structure 300a may be configured. As shown, admin rules data structure 300a may specify a subdomain, one or more level requirements, one or more activity categories and one or more activity rules, among possibly other information. Collectively, this information represents a rule (Rule1) within communications platform 200. In some embodiments, an admin may define a single rule that applies to the school, while in other embodiments, the admin may define multiple rules that apply to different portions of the school.

In the school environment example, the subdomain may be a unique identifier of a particular school (or of a portion of a school such as grade or class). In other words, the subdomain of a rule defines to whom the rule applies.

The level requirements defined within an admin rules data structure may represent different point levels that a student may reach to become eligible for rewards. For example, admin rules data structure 300a includes a list of level requirements (LevelRequirementList) that defines four level requirements (LR1, LR2, LR3 and LR4). Each of these level requirements, which may be defined in level requirement data structures 301, may specify a point requirement for the level (PointsRequired) and a name for the level (Level). Accordingly, the depicted example represents a scenario where an admin at a school (SchoolID1) has defined four different levels: (1) a bronze level that a student reaches upon receiving 100 points; (2) a silver level that a student reaches upon receiving 200 points; (3) a gold level that a student reaches upon receiving 300 points; and (4) a diamond level that a student reaches upon receiving 500 points. This ability to define levels enables the admin to define when a student may be eligible for rewards without needing to be aware of the rewards that may be available.

The activity categories defined within an admin rules data structure may represent different admin-defined categories of activities that could be performed to earn points. For example, admin rules data structure 300a includes a list of activity categories (ActivityCategoryList) that includes a number of activity categories including AC1 and AC2. Each activity category, which may be defined in activity category data structures 302, may specify a category name, a maximum number of points that can be earned for performing activities in the category and possibly a multiplier to be applied to points awarded when such activities are performed.

The activity rules defined within an admin rules data structure may represent different admin-defined rules for activities that could be performed to earn points. Each activity rule may be associated with a particular type of activity and may be associated with a particular category. In other words, each category may represent a grouping of one or more activity rules. Admin rules data structure 300 includes a list of activity rules (ActivityRuleList) that includes a number of activity rules including AR1, AR2 and AR3. Each activity rule, which may be defined in activity rule data structures 303, may identify a particular activity that can trigger the award of points (TriggeringActivity) and a number of points that are awarded for completing the activity. Each activity rule can also define the activity category to which the activity rule belongs.

For example, FIG. 4 shows that activity rule AR1 defines that 1 point should be awarded for the completion of Activity1 and that AR1 pertains to the activity category with a name of Category1 (AC1). Similarly, activity rule AR2 defines that 5 points should be awarded for the completion of Activity2 and that AR2 also pertains to Category1. In contrast, AR3 defines that 1 point should be awarded for the completion of Activity1 but that AR3 pertains to Category2. Although not shown, in some embodiments, an activity rule may also define a subgroup (e.g., a class) of the subdomain (e.g., a school) to which the activity rule pertains. In some embodiments, an admin may be allowed to select from among a set of activities when defining an activity rule (e.g., the TriggeringActivity parameter may be an enumeration). In the context of a school recognition and rewards system, the set of activities may include receiving a grade over some percentage (e.g., 90+%), earning a badge, certification, skill, etc. within the system, being a featured student, completing a goal, answering a flashcard, etc.

As can be seen, the unique configuration of these data structures enables an admin to define rules in a hierarchical manner. In particular, the activity rules define which activities can be performed to earn points, the activity categories define groups of activity rules including maximum points that can be awarded based on activity rules in each group and the level requirements define point thresholds at which a student becomes eligible for particular rewards. Notably, admin rules data structure 300a does not identify and is independent of any definition of a reward within communications platform 200. Therefore, the admin can create and modify rules for determining when rewards should be available without needing to be aware of what rewards are available.

FIG. 5 provides a generalized example of how booster data structures 310 and booster reward data structures 311 may be configured. Each booster data structure 310 can represent a particular booster and may define a booster ID, a booster type (e.g., a non-profit, a company, an individual, etc.), a booster name, an approved status (e.g., whether the provider of communications platform 200 has approved the booster to offer rewards within the various instances of the recognition and rewards system that it may host), etc.

Each booster rewards data structure 311 can represent a particular reward and can define a reward ID, a booster ID of the booster that is offering the reward, a name, a description, a booster-defined level that is required to be eligible for the reward, a start week and an end week defining when the booster is making the reward available, a maximum quantity of rewards the booster is willing to distribute each week, a remaining quantity of rewards, the redeem type (i.e., how a student may redeem the reward), etc. Notably, this content of booster reward data structures 311 is defined by the boosters independently of the definition of the rules that dictate when the rewards will be made available to the students. Although not shown, storage system 230 may also maintain data structures that define whether a particular school has approved a particular booster to thereby allow admins to retain some control over the rewards that will be made available to their students.

FIG. 6 provides a generalized example of how user data structures 320 and user participation data structures 321 may be configured. Each user data structure 320 can represent a particular user (e.g., a student) within communications platform 200 such as by defining a user ID, name, etc. Each user participation data structure 321 can represent a particular user's participation within a recognition and rewards system during a particular period of time. In the depicted example, each user participation data structure 321 identifies the user ID of a particular user, an identifier of a particular week, a point total that the user earned during that particular week, the level that the point total represents as defined by the applicable rule and the per-category points (e.g., a list of category/point pairs). The example shown in FIG. 6 represents that there may be multiple user participation data structures 321 for each student that participates in the recognition and rewards system. In particular, for a student having an ID of User1, there may be a user participation data structure 321 representing the student's participation during a first week (e.g., the week having an ID of 1) and another user participation data structure 321 representing the student's participation during a second week (e.g., the week having an ID of 2). As described in greater detail below, rules engine 240 can create and maintain user participation data structures 321 based on the student's participation in the recognition and rewards system and by employing the rules that are applicable to the student.

Figure 7:
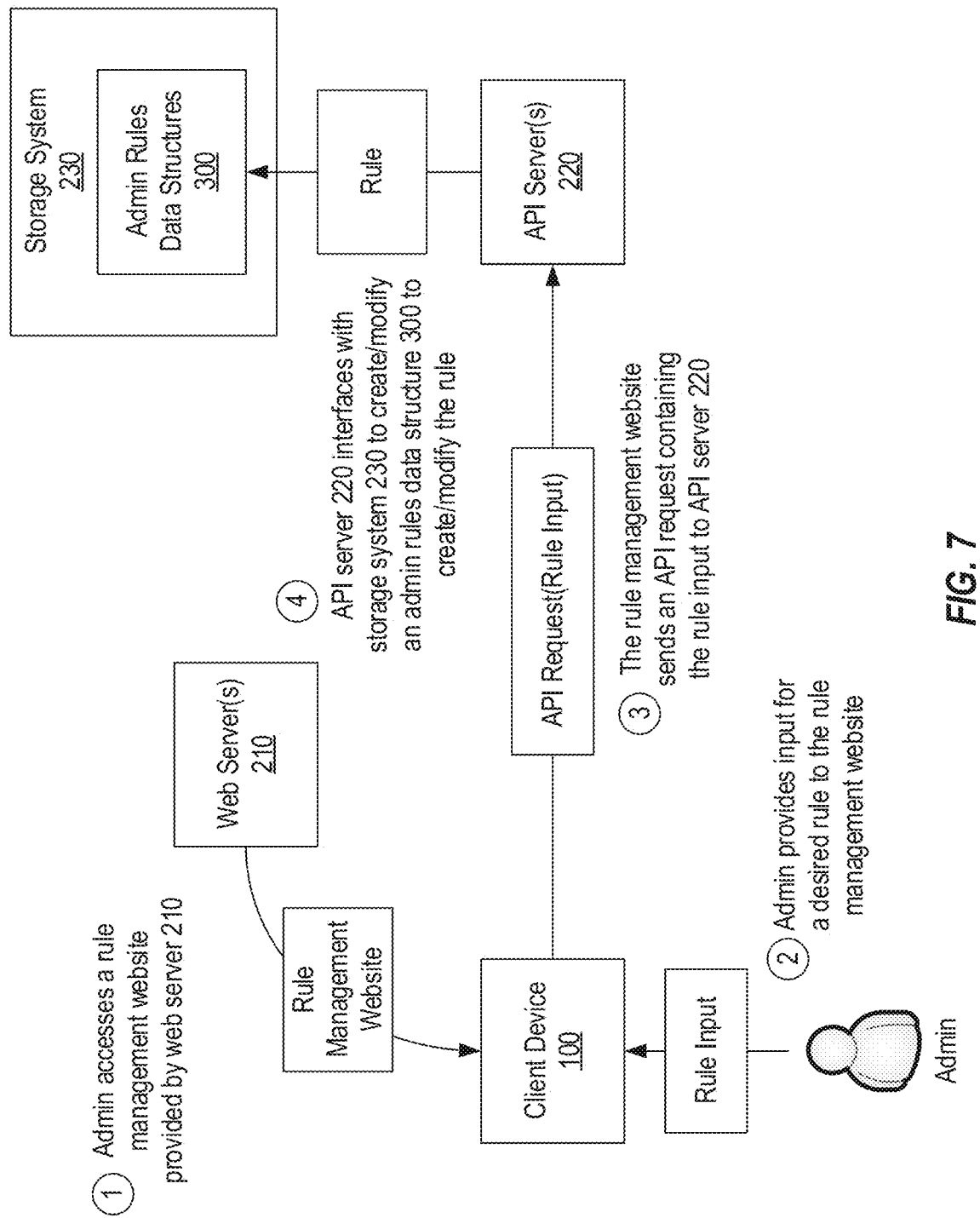
FIG. 7 represents how an admin can create a rule in the communications platform.

FIG. 7 provides an example of how communications platform 200 may allow an admin to create (or modify) a rule. In step 1, the admin may employ client device 100 to access a rule management website provided by web server 210. Alternatively, the admin could use a dedicated client-side application. In step 2, the admin may provide input representing the desired rule ("rule input") to the rule management website. In step 3, which may be performed in response to the admin submitting the rule input, the rule management website may send an API request containing the rule input to API server 220. In step 4, API server 220 can respond to the API request by creating (or modifying) an admin rules data structure 300 in storage system 230 that is configured in accordance with the rule input. For example, the rule input could specify the information necessary to create level requirement data structures 301, activity category data structures 302 and activity rule data structures 303.

Figure 8:
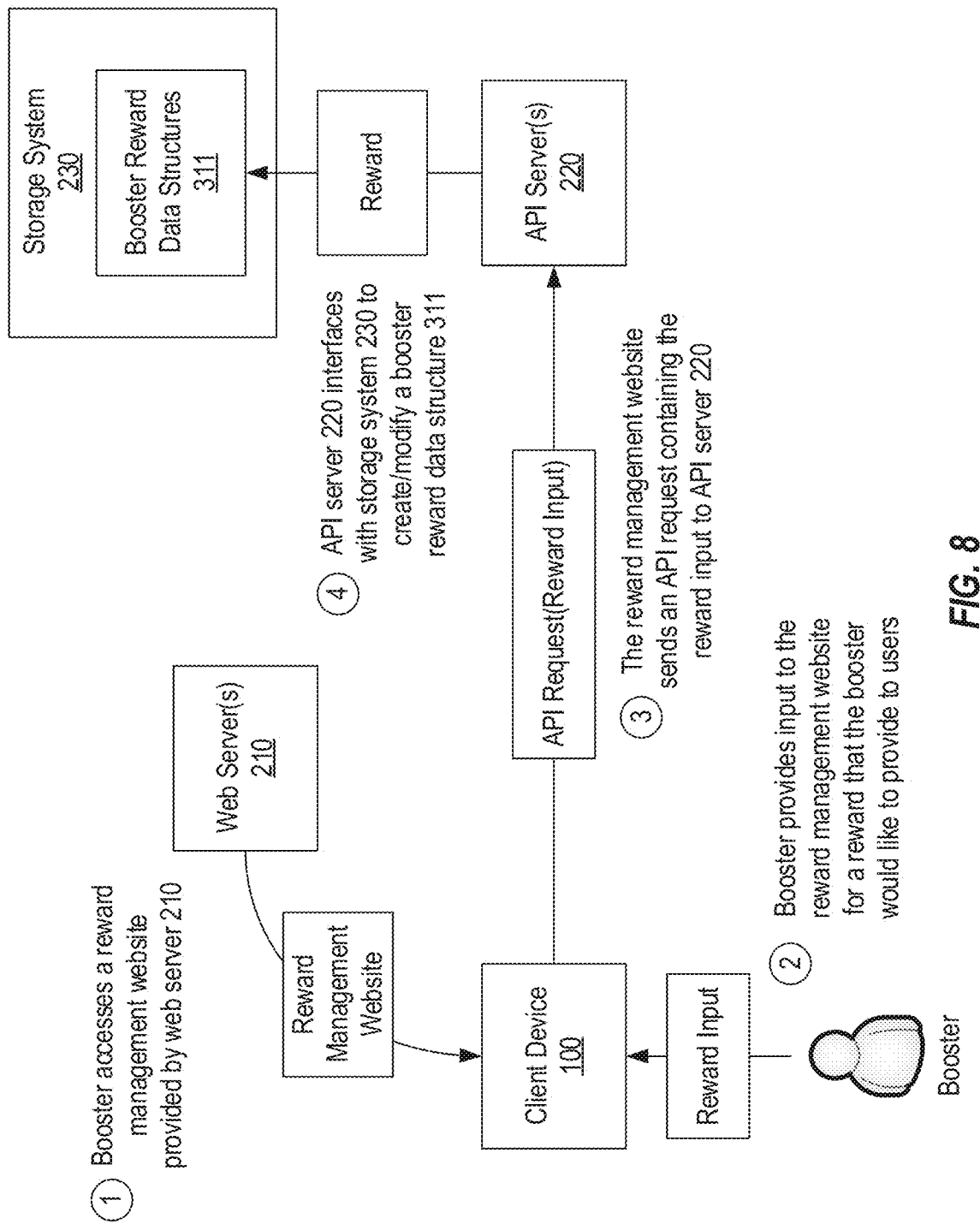
FIG. 8 represents how a booster can create a reward in the communications platform.

FIG. 8 provides an example of how communications platform 200 may allow a booster to create (or modify) a reward. In step 1, the booster may employ client device 100 to access a reward management website provided by web server 210. Alternatively, the booster could use a dedicated client-side application. In step 2, the booster may provide input representing a reward ("reward input") to the reward management website. In step 3, which may be performed in response to the booster submitting the reward input, the reward management web site may send an API request containing the reward input to API server 220. In step 4, API server 220 can respond to the API request by creating (or modifying) a booster reward data structure 311 in storage system 230 that is configured in accordance with the reward input. Notably, the processes shown in FIGS. 7 and 8 are performed independently of one another. Because of the underlying configuration of communications platform 200, there is no need for the admins to be aware of the rewards the boosters may provide and no need for the boosters to be aware of the rules that the admins define.

Figure 9A:
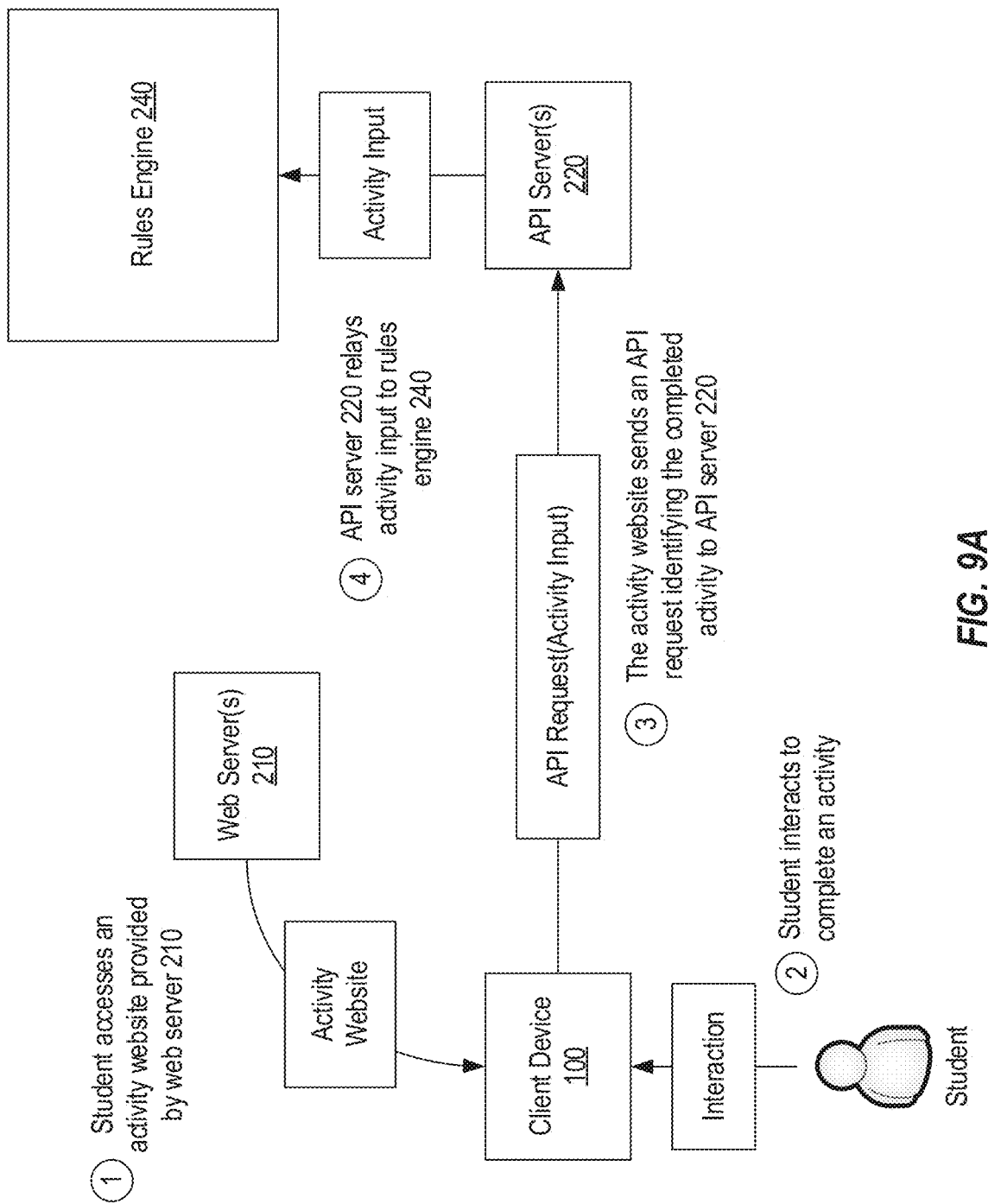
FIGS. 9A-9C represent how points may be awarded to a user of a recognition and rewards system that is implemented on the communications platform.
Figure 9B:
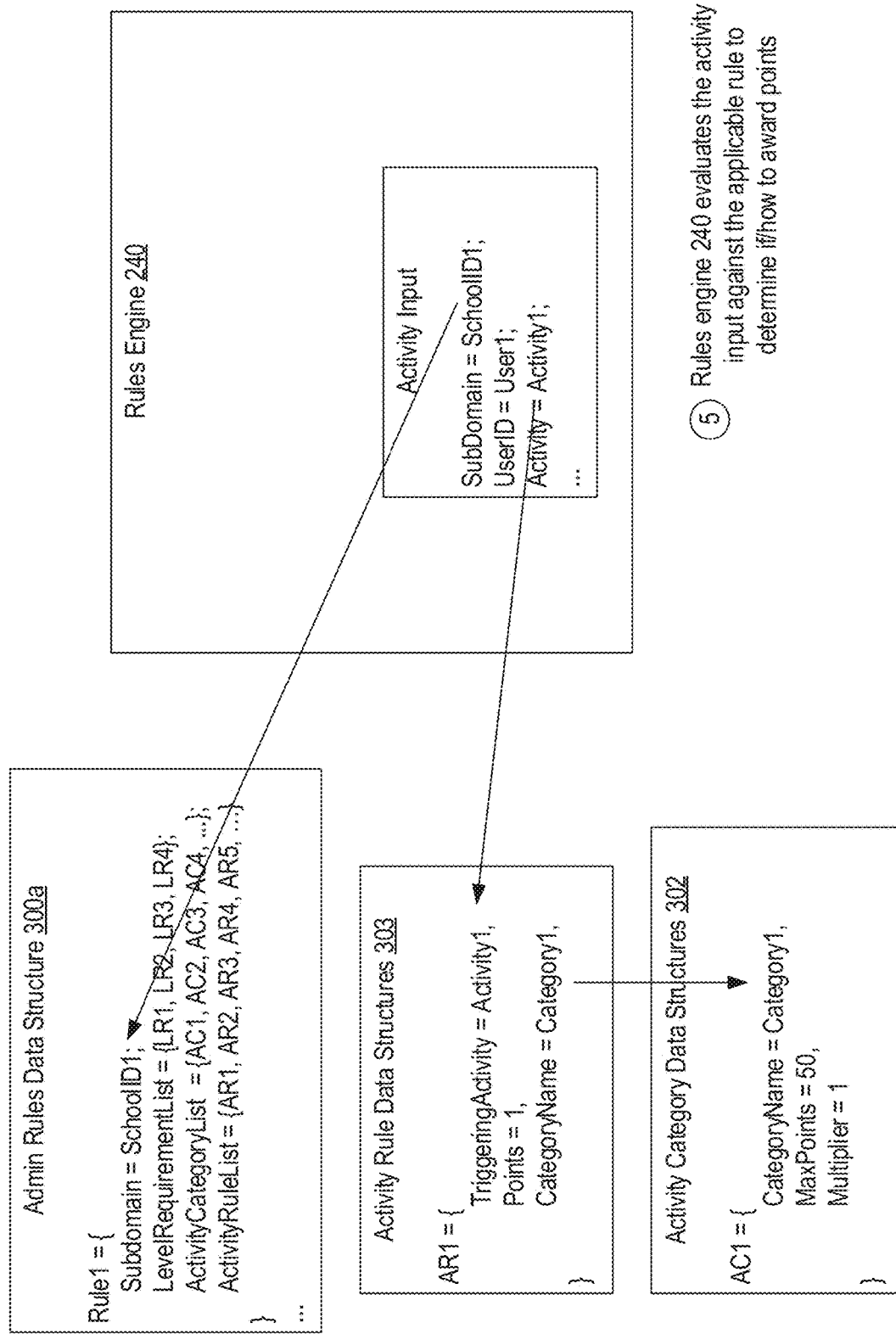
Figure 9C:
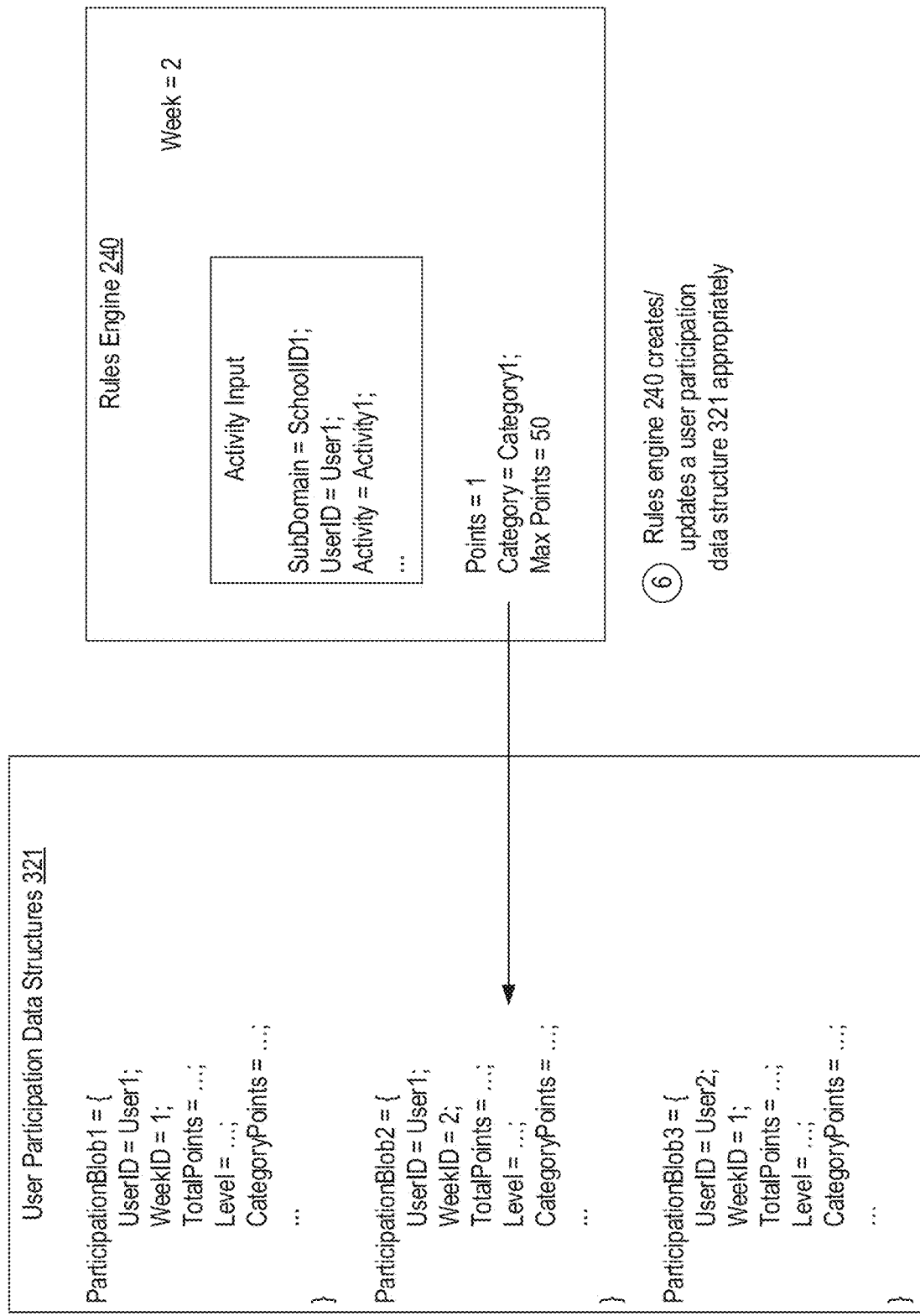

FIGS. 9A-9C provide an example of how communications platform 200 may allow a student to perform activities within a recognition and rewards system and how rules engine 240 employs applicable rules to determine what points should be awarded for the activities. Although these figures represent a scenario where the student interacts directly with communications platform 200, the same process can be triggered in response to a teacher or other user interacting with communications platform 200 to report/define an activity that a student has performed. Accordingly, the particular way in which the student's completion of an activity may be reported/triggered in communications platform 200 is not essential to the present invention.

In step 1, the student may employ client device 100 to access an activity website provided by web server 210. Alternatively, the student could use a dedicated client-side application. In step 2, the student may interact with the activity website (or app) to complete an activity. In step 3, the activity website may send an API request to API server 220 where the API request identifies the activity that the student completed ("activity input"). For example, the activity input may include the ID of the student's school and the student's ID and may also identify the type of activity that the student completed. In step 4, API server 220 can relay the activity input to rules engine 240.

Turning to FIG. 9B, in step 5, rules engine 240 can evaluate the activity input against the applicable rule to determine if and how points should be awarded to the student for having completed the activity. For example, rules engine 240 could determine that Rule1 is the applicable rule using the school identifier specified in the activity input. Rules engine 240 may then identify the activity rules data structure 303 that matches the type of activity specified in the activity input (Activity1). From the matching activity rules data structure 303, rules engine 240 can obtain the number of points that should be awarded (1) and can also identify the applicable activity category data structure 302 (Category1) to obtain the maximum points (50) that can be awarded for completing activities in this category and any multiplier (1).

Turning to FIG. 9C, in step 6, rules engine 240 can create or update a user participation data structure 321 appropriately. In this example, it is assumed that it is week 2. Therefore, rules engine 240 can find or create a user participation data structure 321 (ParticipationBlob2) and populate or update it accordingly. In particular, rules engine 240 could identify that ParticipationBlob2 pertains to User1 and week 2. Rules engine 240 could then access the CategoryPoints element to determine if User1 has already received the maximum points (50) for Category1. If not, rules engine 240 could update the total points and the point total for Category1 within ParticipationBlob2. Although not shown, after or in conjunction with updating the point total, rules engine 240 may also update the level. For example, if rules engine 240 updates the point total to 100, it could also set the level to Bronze (or a numerical value representing this level such as "1").

The process shown in FIG. 9A-9C can be repeatedly performed as the various students complete activities within their respective recognition and rewards systems hosted by communications platform 200. Accordingly, at any given time, user participation data structures 321 may define the level obtained by a student during each week. This underlying configuration of communications platform 200 facilitates the linking of rules with independently defined rewards as described in further detail below.

Figure 10A:
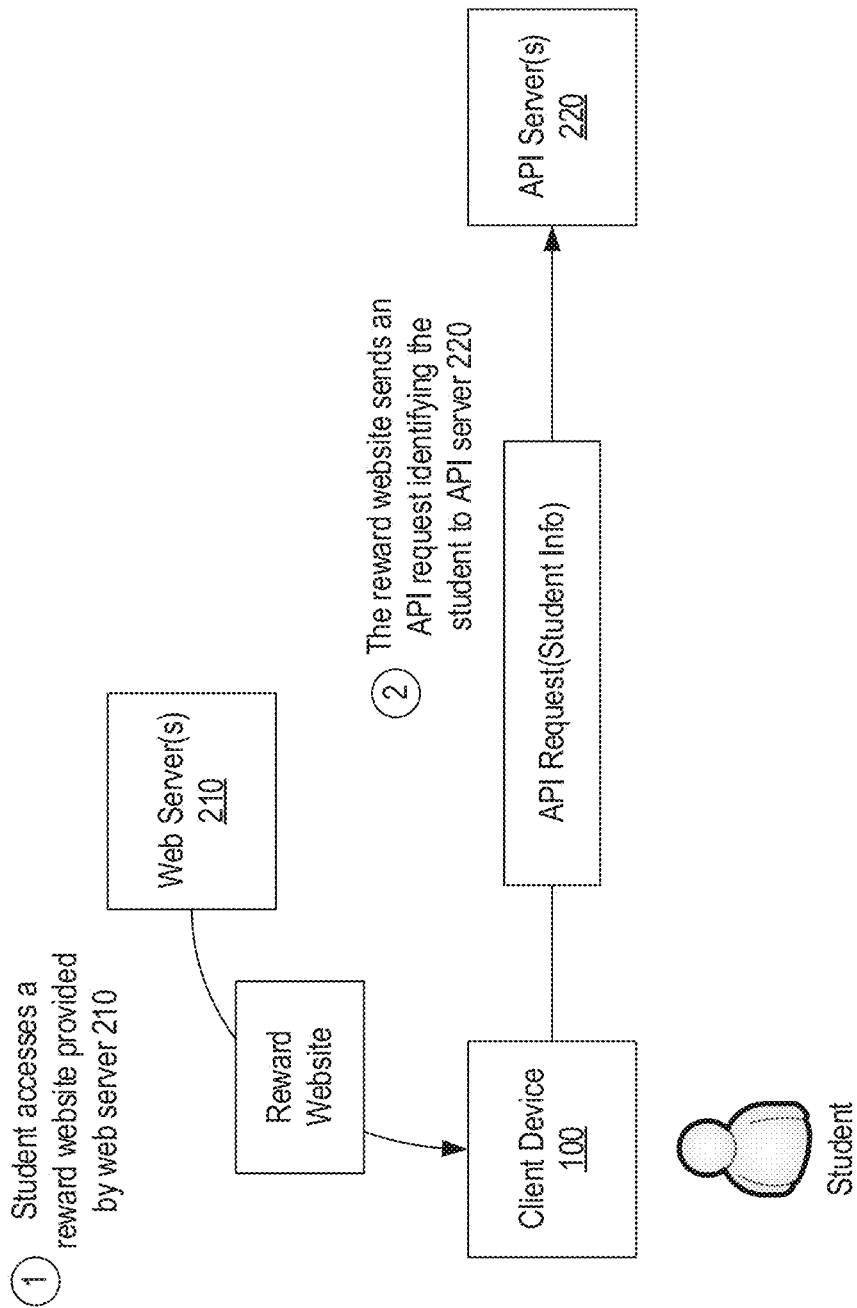
Figure 10C:
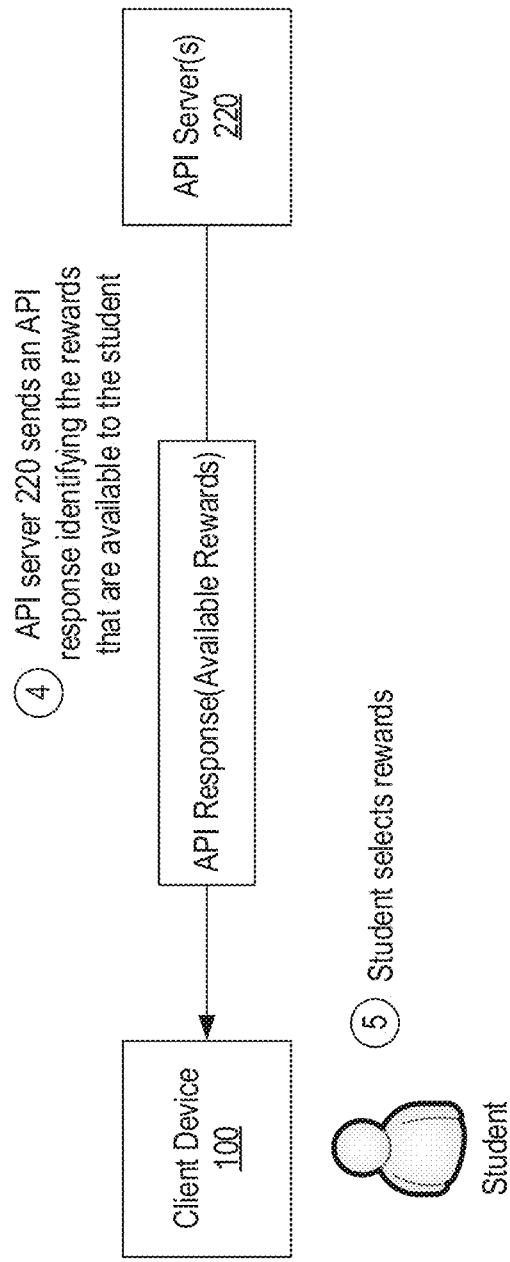

FIGS. 10A-10C provide an example of how communications platform 200 enables a student to view and select rewards that he or she is eligible to receive. In step 1, the student may use client device 100 to access a reward website. Alternatively, the student may access reward functionality via a dedicated client-side app. In step 2, which may be performed as part of loading the reward website, in response to the student selected an option to view available rewards, or some other trigger, the reward web site may send an API request to API server 220 that identifies that student.

Turning to FIG. 10B, in step 3, API server 220 can respond to the API request by using the student's identifier to retrieve each user participation data structure 321 that pertains to the student. In this example, it is assumed that there are two user participation data structures 321 for the student having an identifier of User1, one for week 1 (ParticipationBlob1) and one for week 2 (ParticipationBlob2). As shown, it is assumed that the student reached level 4 during week 1 and level 1 during week 2. With this information, API server 220 can access booster reward data structures 311 to identify any rewards that should be made available to the student. In this example, API server 220 could search for any booster reward data structure 311 that the booster had made available for week 1 given that the student reached the highest level during week 1. In contrast, API server 220 could search for any booster reward data structure having a required level of 1 that a booster has made available during week 2 given that the student only reached level 1 during week 2. API server 220 could also filter out any rewards that are no longer available (e.g., when the maximum quantity has already been redeemed). Accordingly, this process of identifying which rewards are available to the student is based on the level the student obtained during the week. How the student earns points to reach a level is controlled by the admin-defined rules, while the rewards that are available at each level is controlled by the booster independent of the admin. The underlying configuration of communications platform 200, including the unique set of data structures and the unique functionality that API server 220 and rules engine 240 perform, enables this linking of the rules to the rewards even though they are independently defined and managed.

Turning to FIG. 10C, in step 4, API server 220 sends an API response to the rewards website which identifies the rewards that are available to the student. The rewards website can then present the rewards to the student and provide an option for the student to select from the rewards in step 5. Although not shown, when a student selects a reward, an API request can be sent to API server 220 identifying the student and the reward that the student selected (e.g., the RewardID). In response, API server 200 can update booster rewards data structures 311 appropriately and can also update issued reward data structures 330 to track that the reward has been awarded to the student (e.g., to limit the student to one reward per week for each level reached).

In some embodiments, API server 220 may also provide a unique identifier (e.g., a QR code or bar code) to the student to allow the student to redeem the reward directly from the booster. In such cases, when the student presents the unique identifier to the booster (e.g., by presenting the QR code when visiting the booster's store), the booster may scan or otherwise input the unique identifier into an app, website or other component that can send an API request to API server 220 to indicate that the student has redeemed the reward. In response, API server 220 can update booster reward data structures 311 and issued reward data structures 330 to indicate that the reward has been redeemed.

In some embodiments, storage system 230 may also maintain various denormalized data structures that can facilitate efficient querying of participation of students within a class or other grouping. For example, a backend component of communications platform 200 may be configured to periodically scan storage system 230 to generate a data structure that lists each student in the school or a particular class by the level that the students obtained. Such a data structure could facilitate quickly identifying which students may be routinely reaching level 1 only so that the admin can determine how to adjust the rules to provide a better incentive to such students.

In summary, embodiments of the present invention enable admins to configure rules based on their desired learning outcomes. These learning outcomes are then incentivized by boosters that independently define rewards. The above-described configuration of communications platform 200 is a technical solution to the technical problem of integrating boosters and their rewards into a recognition and rewards system and particularly to the technical problem of providing such integration without requiring tight coupling between the rules for determining when rewards should be issued and the rewards themselves.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A communications platform for integrating rewards into a recognition and rewards system without requiring the rewards to be tightly coupled to rules that define when the rewards are available to thereby facilitate implementation of the recognition and rewards system in distributed networking environments, the communications platform comprising:
    an API server that receives API requests from a plurality of client devices, the API requests including a first set of API requests for creating rules defining when rewards are to be made available to users, a second set of API requests, separate from the first set of API requests, for creating the rewards, and a third set of API requests, separate from the first and second sets of API requests, for viewing rewards that are available to a student such that the first, second, and third sets of API requests enable implementation of the recognition and rewards system in distributed networking environments;
    a storage system that stores admin rules data structures that define the rules, each admin rules data structure defining a plurality of levels, wherein each admin rules data structure identifies a plurality of activity rule data structures, each activity rule data structure identifying an activity, a number of points that is awarded for performing the activity and a category, wherein each admin rules data structure also identifies a plurality of activity category data structures, each activity category data structure identifying a maximum number of points that can be awarded for performing an activity that is associated with a category, the storage system also storing booster reward data structures, each booster reward data structure defining a reward and a level, wherein the plurality of levels defined in each admin rules data structure are set by an admin via the first set of API requests and the level defined in each booster reward data structure is independently set by a booster via the second set of API requests; and
    a rules engine that evaluates users' activities against the rules to thereby calculate a level for each user, wherein the API server employs the level calculated from the rules for each user and the level defined in each booster reward data structure to determine which rewards to present to each user;
    wherein, in response to the third set of API requests, the API server employs the level calculated from the rules for each user and the level defined in each booster reward data structure to determine which rewards to present to each user.

2. The communications platform of claim 1, wherein each admin rules data structure identifies a subdomain.

3. The communications platform of claim 1, wherein each admin rules data structure identifies a plurality of activity rule data structures, each activity rule data structure identifying an activity, a number of points that is awarded for performing the activity and a category.

4. The communications platform of claim 3, wherein each admin rules data structure also identifies a plurality of activity category data structures, each activity category data structure identifying a maximum number of points that can be awarded for performing an activity that is associated with a category.

5. The communications platform of claim 1, wherein the storage system stores user participation data structures, each user participation data structure identifying a user, a particular period of time and the level the rules engine calculated for the user for the particular period of time.

6. The communications platform of claim 5, wherein the storage system stores multiple user participation data structures for a single user where each of the multiple user participation data structures identifies a different particular time period.

7. The communications platform of claim 6, wherein each different particular time period is a different week.

8. The communications platform of claim 1, wherein each booster reward data structure also defines one or more time periods during which the respective reward should be made available to users, and wherein the one or more time periods are set via the second set of APIs.

9. The communications platform of claim 1, wherein each booster reward data structure also defines a maximum quantity of the respective reward that may be redeemed during a particular time period, and wherein the maximum quantity is set via the second set of APIs.

10. The communications platform of claim 1, wherein the API server provides a unique identifier to a user when the user selects a reward, and wherein the API requests also include an additional set of API requests by which a booster can submit the unique identifier to the API server.

11. The communications platform of claim 1, wherein the API requests also include an additional set of API requests by which the admins approve boosters.

12. One or more computer storage media storing computer executable instructions which when executed implement a communications platform for integrating rewards into a recognition and rewards system without requiring the rewards to be tightly coupled to rules that define when the rewards are available to thereby facilitate implementation of the recognition and rewards system in distributed networking environments, the communications platform comprising:
    an API server that receives API requests from a plurality of client devices, the API requests including a first set of API requests for creating rules defining when rewards are to be made available to users, a second set of API requests, separate from the first set of API requests, for creating the rewards, and a third set of API requests, separate from the first and second sets of API requests, for viewing rewards that are available to a student such that the first, second, and third sets of API requests enable implementation of the recognition and rewards system in distributed networking environments;

a storage system that stores admin rules data structures that define the rules, each admin rules data structure defining a plurality of levels, wherein each admin rules data structure identifies a plurality of activity rule data structures, each activity rule data structure identifying an activity, a number of points that is awarded for performing the activity and a category, wherein each admin rules data structure also identifies a plurality of activity category data structures, each activity category data structure identifying a maximum number of points that can be awarded for performing an activity that is associated with a category, the storage system also storing booster reward data structures, each booster reward data structure defining a reward and a level, wherein the plurality of levels defined in each admin rules data structure are set by an admin via the first set of API requests and the level defined in each booster reward data structure is independently set by a booster via the second set of API requests; and a rules engine that evaluates users' activities against the rules to thereby calculate a level for each user, wherein the API server employs the level calculated from the rules for each user and the level defined in each booster reward data structure to determine which rewards to present to each user;

wherein, in response to the third set of API requests, the API server employs the level calculated from the rules for each user and the level defined in each booster reward data structure to determine which rewards to present to each user.

13. The computer storage media of claim 12, wherein the storage system stores user participation data structures, each user participation data structure identifying a user, a particular period of time and the level the rules engine calculated for the user for the particular period of time.

14. The computer storage media of claim 13, wherein the storage system stores multiple user participation data structures for a single user where each of the multiple user participation data structures identifies a different particular time period.

15. The computer storage media of claim 12, wherein the API server provides a unique identifier to a user when the user selects a reward, and wherein the API requests also include an additional set of API requests by which a booster can submit the unique identifier to the API server.

16. A method, performed in a communications platform, for integrating rewards into a recognition and rewards system without requiring the rewards to be tightly coupled to rules that define when the rewards are available to thereby facilitate implementation of the recognition and rewards system in distributed networking environments that include an admin's client device, a booster's client device, and a user's client device, the method comprising:

receiving, at an API server and from the admin's client device, a first API request that requests the creation of a first rule for defining when rewards are to be made available to users of the recognition and rewards system, the first API request including a plurality of levels;

creating, in a storage system, an admin rules data structure for the first rule, the admin rules data structure defining the plurality of levels, wherein the admin rules data structure identifies a plurality of activity rule data structures, each activity rule data structure identifying an activity, a number of points that is awarded for performing the activity and a category, wherein the admin rules data structure also identifies a plurality of activity category data structures, each activity category data structure identifying a maximum number of points that can be awarded for performing an activity that is associated with a category;

receiving, at the API server and from the booster's client device, a second API request that requests the creation of a first reward that the booster desires to be made available to the users of the recognition and rewards system, the second API request associating a level with the first reward;

creating, in the storage system, a booster reward data structure that defines the first reward and the level;

evaluating, by a rules engine, a user's activities against the first rule to thereby calculate a level for the user;

receiving, at the API server and from the user's client device, a third API request that requests to view rewards that are available to the user;

comparing the level calculated for the user by evaluating the user's activities against the first rule to the level defined in the booster reward data structure; and in conjunction with determining that the level calculated for the user by evaluating the user's activities against the first rule meets the level defined in the booster reward data structure, presenting the first reward to the user.

17. The method of claim 16, wherein evaluating the user's activities against the first rule to thereby calculate the level for the user comprises creating, in the storage system, a first user participation data structure.

18. The method of claim 17, wherein the first user participation data structure is associated with a first time period such that the level pertains to the first time period, and wherein the storage system also stores a second user participation data structure that defines a level for the user during a second time period.

* * * * *